US011860582B2

(12) United States Patent
Willemin et al.

(10) Patent No.: US 11,860,582 B2
(45) Date of Patent: Jan. 2, 2024

(54) WINDING DEVICE FOR AUTOMATIC WATCH

(71) Applicant: The Swatch Group Research and Development Ltd, Marin (CH)

(72) Inventors: Michel Willemin, Preles (CH); Jérôme Favre, Neuchatel (CH); Nicolas Livat, Cressier (CH)

(73) Assignee: The Swatch Group Research and Development Ltd, Marin (CH)

(*) Notice: Subject to any disclaimer, the term of this patent is extended or adjusted under 35 U.S.C. 154(b) by 204 days.

(21) Appl. No.: 17/246,891

(22) Filed: May 3, 2021

(65) Prior Publication Data

US 2022/0113682 A1 Apr. 14, 2022

(30) Foreign Application Priority Data

Oct. 14, 2020 (EP) .................................... 20201698

(51) Int. Cl.
*G04C 1/06* (2006.01)
*G04C 1/12* (2006.01)
*G04D 7/00* (2006.01)

(52) U.S. Cl.
CPC ............... *G04C 1/062* (2013.01); *G04C 1/12* (2013.01); *G04D 7/009* (2013.01)

(58) Field of Classification Search
CPC ........... G04C 1/062; G04C 1/12; G04D 7/009
See application file for complete search history.

(56) References Cited

U.S. PATENT DOCUMENTS 6,439,761 B1 * 8/2002 Agnoff ..................... G04C 1/00 81/7.5
7,729,207 B2 * 6/2010 Kawaguchi ............ G04C 10/04 368/64
9,836,027 B2 * 12/2017 Willemin ............... G04C 1/024
2015/0117164 A1 * 4/2015 Ng ......................... G04B 3/006 368/208
2018/0052427 A1 * 2/2018 Lieb ....................... G04D 7/009
2018/0181075 A1 6/2018 Born et al.
2018/0341225 A1 * 11/2018 Favre ................... A44C 5/0007

FOREIGN PATENT DOCUMENTS

EP 3 339 984 A1 6/2018
WO WO 2016/184736 A1 11/2016

OTHER PUBLICATIONS

European Search Report dated Feb. 23, 2021 in European Application 20201698.6 filed on Oct. 14, 2020, 3 pages (with English Translation of Categories of Cited Documents).

* cited by examiner

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A winding device includes a motor for driving a watch holder carrying at least one automatic watch with a mobile oscillating mass, and a multimeter for measuring a variation in a resistive torque opposed to the motor by the watch holder equipped with watches, depending on a degree of winding of the watches. The multimeter includes a speed meter to determine a speed and/or a variation in the speed of the motor, a torque meter to determine a value of a torque and/or a variation in the torque at the watch holder, and/or a current meter to determine a value of a current and/or a variation in the current of an electric motor.

17 Claims, 3 Drawing Sheets

WINDING DEVICE FOR AUTOMATIC WATCH

CROSS-REFERENCE TO RELATED APPLICATION

This application claims priority to European Patent Application No. 20201698.6 filed on Oct. 14, 2020, the entire disclosure of which is hereby incorporated herein by reference.

FIELD OF THE INVENTION

The invention relates to an automatic device for winding automatic watches.

The invention also relates to a universal device for winding and time setting a watch, including such an automatic device for winding watches.

The invention relates to the field of smart devices, such as smart winders, for maintaining watches in immediate serviceability, displaying the correct time, and with sufficient power reserve to be worn for a few hours, while avoiding premature wear of the watch by incessant and unnecessary windings.

BACKGROUND OF THE INVENTION

Document EP3339984 in the name of The Swatch Group Research and Development Ltd describes a smart device for winding watches. This device is subject to constant improvements.

In particular, one of the developments relates to a smart winder, based on limiting the unnecessary winding of automatic watches, and whose main purpose is to limit the recharging of the automatic barrel of the watch to what is strictly necessary, to avoid any premature wear of the watch, caused by excessive windings.

To identify whether a watch is fully charged, the amplitude of the balance-spring is measured by an acoustic method. However, it remains difficult to perform an accurate and reliable measurement of the amplitude, due to the background noise, at a reasonable cost, and with low power consumption. In addition, for optimal precision, this method requires contact with the measured watch, or at least the installation of an air microphone very close to the resonator of the watch, in a low-noise environment.

SUMMARY OF THE INVENTION

The invention proposes to measure the winding or coiling rate of a mechanical watch with automatic winding, by measuring the influence that the winding mechanism has on the automatic winding device of automatic watches, hereinafter referred to as winder.

An advantageous application relates to the production of a smart winder with torque measurement.

To this end, the invention relates to a winding device for an automatic watch with a mobile oscillating mass, according to claim 1.

BRIEF DESCRIPTION OF THE DRAWINGS

Other features and advantages of the invention will become apparent upon reading the detailed description which follows, with reference to the appended drawings, where.

DETAILED DESCRIPTION OF THE PREFERRED EMBODIMENTS

The invention proposes to supplement the acoustic measurement of the amplitude with a measurement of the influence that the winding state of the watch has on the winder. This is because the winding angle of the oscillating mass (also called the dead angle) increases with the winding rate, since the barrel spring opposes the torque of the mass.

The centre of gravity CG of the oscillating mass 10 is eccentric, and is located, relative to its axis of rotation, on a radial which is called here radial of the centre of mass RCM. If, in a simplified approach, the friction is neglected, the system of forces applied to the oscillating mass 10 boils down to the opposition between the return torque exerted by the barrel geartrain on the one hand, and the torque exerted by gravitation on the oscillating mass 10. When an automatic watch is disposed with the plane of the oscillating mass parallel to the field of gravity, the angle AM that this radial of the centre of mass RCM makes with the vertical V of the place is called "dead angle".

Figure 1:
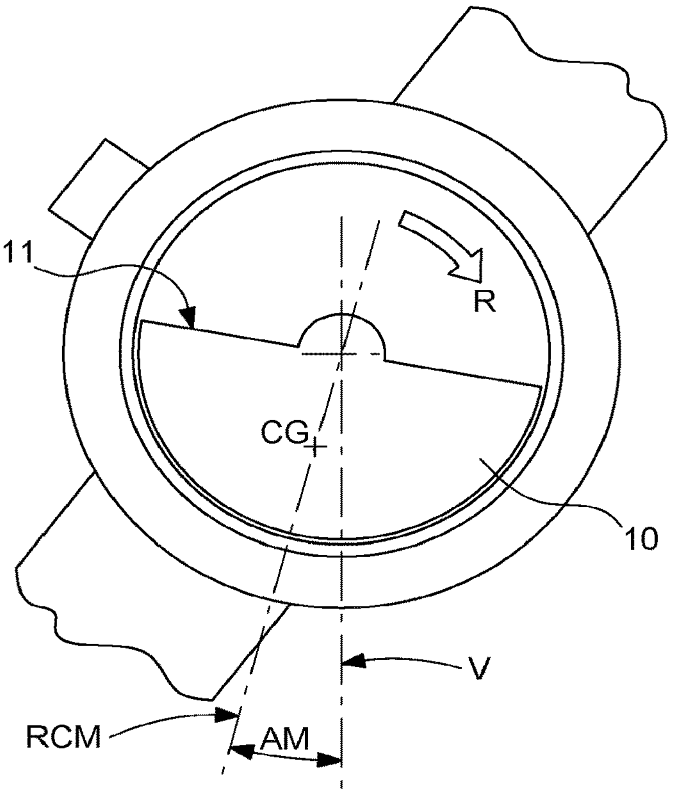
FIG. 1 shows, schematically and in front view, the back of an automatic watch, positioned with the plane of its oscillating mass parallel to the field of gravity, in an unwound state of the watch, wherein the dead angle is almost zero.

When the watch is unwound, and an hour torque R is applied thereto in this same plane to recharge it, this dead angle AM is very small: the right edge 11 that an oscillating mass 10 generally includes remains almost horizontal, as shown in FIG. 1.

Figure 2:
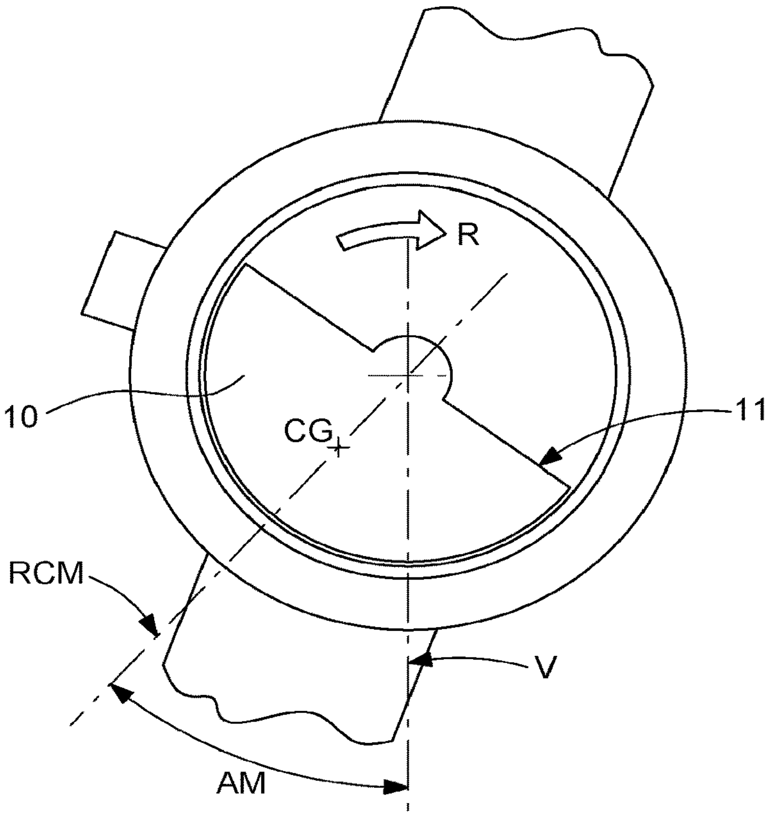
FIG. 2 shows, similarly to FIG. 1, the same watch in a fully wound state, where the blind angle is maximum.

On the other hand, when the watch is fully wound, and under the same conditions, and as visible in FIG. 2, the dead angle AM is considerably higher (for example 24° more for a standard movement ETA 2824, well known to the person skilled in the art and very widespread), since the torque of the barrel spring is maximum and opposes the torque of the oscillating mass 10: the balance is only possible at a large angle so that the gravity torque balances that coming from the barrel.

In short, this change of angle has the effect of shifting the centre of mass of the entire watch, which has a measurable unbalance effect on the winder 100 on which the watch is placed, through a watch holder 1.

Three non-limiting methods, and which can be combined, are proposed for measuring this effect.

Figure 3:
FIG. 3 is a curve which represents, on the y-axis, the winder speed, which is variable as a function of the number of winding revolutions on the x-axis.
Figure 4:
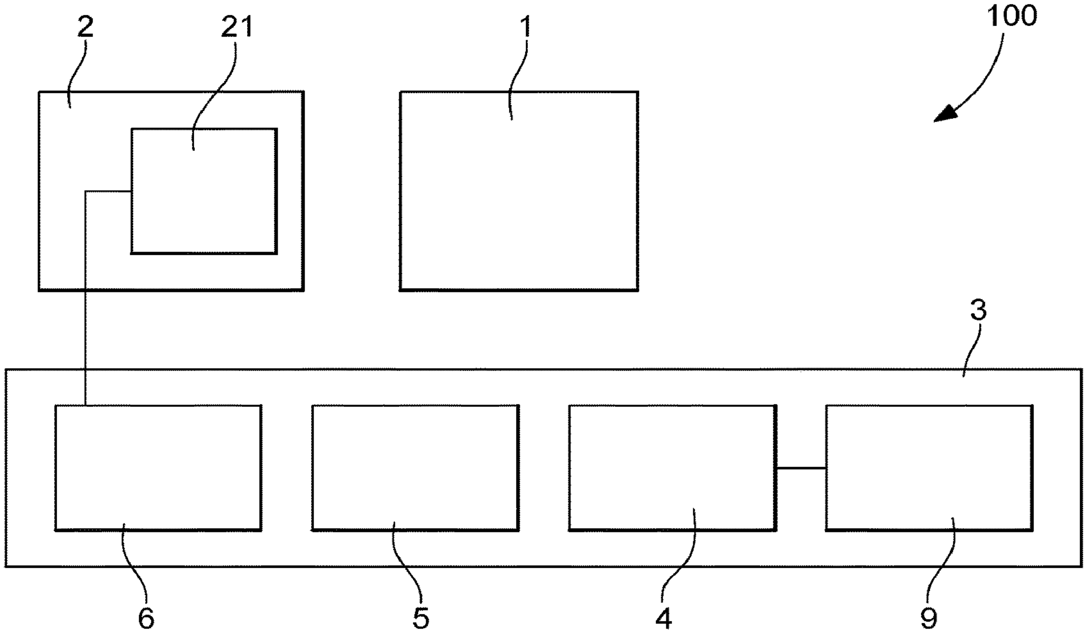
FIG. 4 is a block diagram which includes the various measuring means that can be used to measure the variation in the resistive torque which is opposed to the motorisation means, and therefore the degree of winding of the watch.
Figure 5:
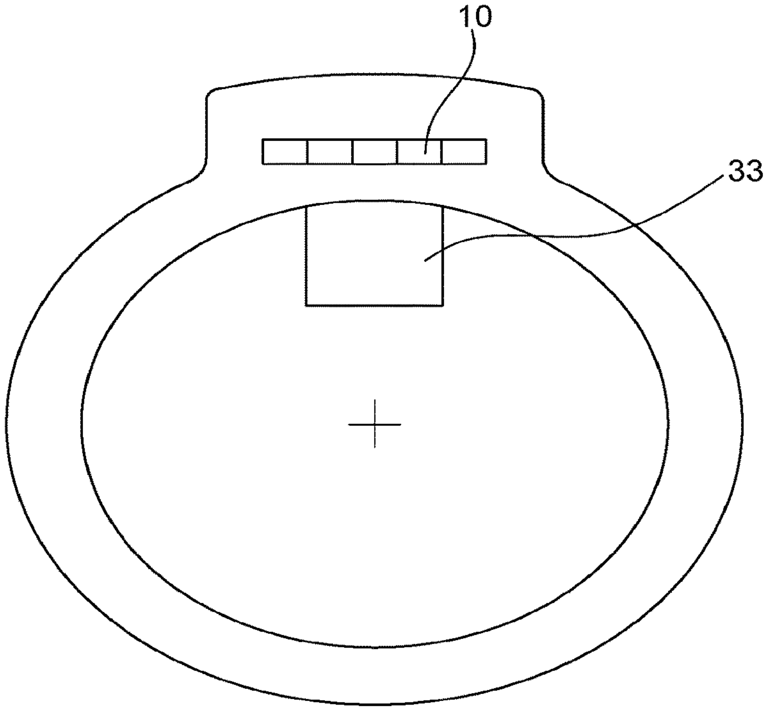
FIG. 5 is a sectional view of a watch holder adapted for an automatic watch including a transparent background, under which a camera tracks the value of the blind angle.
Figure 6:
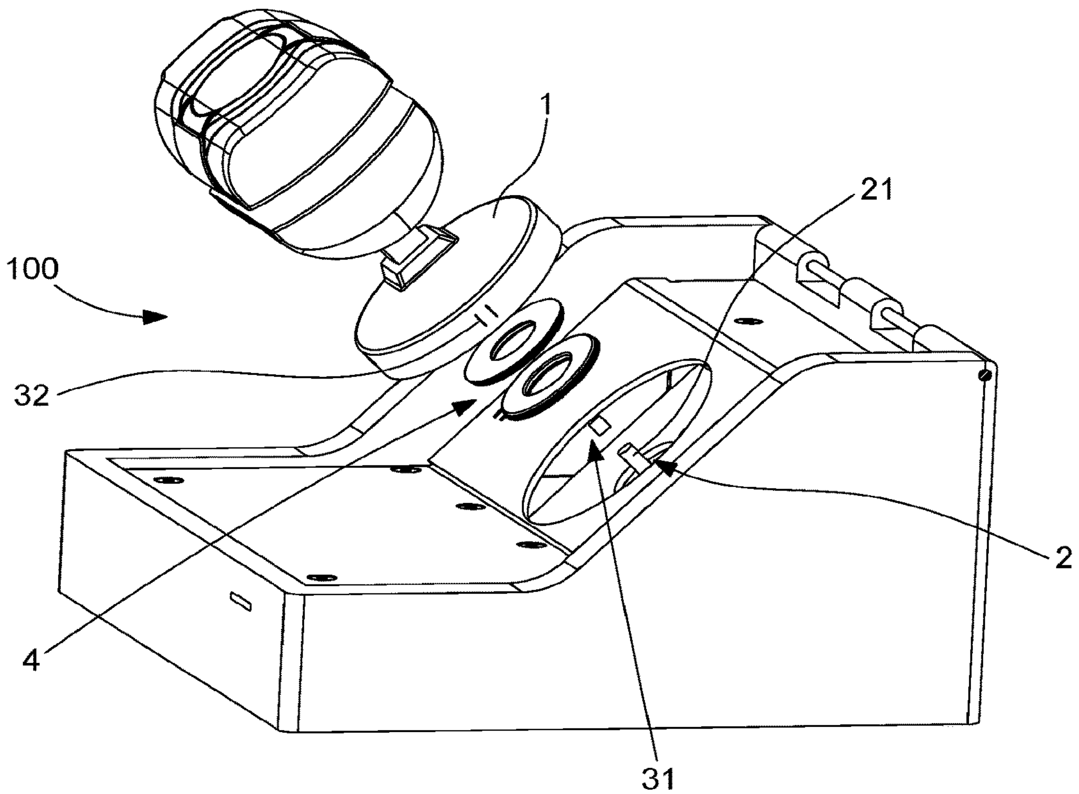
FIG. 6 shows, schematically, in exploded perspective, a winding device according to the invention, in a variant with optical measurement.

Speed measurement is advantageous because it is an efficient and inexpensive method. The winder 100 is equipped with a direct current motor 21 which is not speed-controlled, only the supply voltage is constant (imposed by the algorithm). When the watch is discharged, the torque opposed by the watch is at the minimum, and the winder speed is at the maximum. When the watch is fully wound, the torque opposed by the watch is at the maximum, and the winder speed is at the minimum. FIG. 3 shows the evolution of the winder speed (in revolutions per second) as a function of the number of winding revolutions 100, during the complete winding of a watch. It can be seen that this speed of rotation decreases by approximately 0.8% when the watch is fully charged (after approximately 2000 winding revolutions). In this embodiment, the winder 100 speed is simply carried out using a fixed optical sensor 31 and a mobile locator 32 integral with the rotating watch holder 1.

Torque measurement is an efficient method but more expensive than the previous one. The torque opposing the oscillating mass 10 increases as the winding increases, until reaching a plateau when the watch is fully wound. The torque can be measured with a torque tester or torquemeter mounted on the watch holder. The advantage of a torquemeter is its high sensitivity.

The measurement of the current injected into the motor of the winder is a cheap, but delicate method, unless averaging is carried out long enough. The current of a direct current motor as used in the winder is proportional to its charge, and therefore to the torque opposed by the rotor made of the watch holder and the watch with its oscillating mass 10. Measurements show that a winder equipped with a discharged watch consumes around 2 mA (at 1V), with periodic variations that can reach +/−0.5 mA (or +/−25%) during one revolution of the watch holder. It can be shown that the average current should theoretically increase by only 40 μA when the watch is fully charged, that is to say an average increase of only 2% compared to the reference 2 mA. If the current measurement is averaged long enough (typically several revolutions, that is to say a few tens of seconds, which corresponds to a low-pass filter, which cancels the periodic variations), this 2% increase in the average current becomes possible to detect compared to noise.

Thus, more particularly, the invention relates to a winding device 100 for an automatic watch with a mobile oscillating mass.

This device 100 includes at least one watch holder 1, which is arranged to carry at least one automatic watch. The device 100 includes motorisation means 2 for driving, in particular at least in rotation, the at least one watch holder 1, and more particularly each watch holder 1 that it includes.

According to the invention, the device 100 includes measuring means 3, which are arranged to measure the variation in the resistive torque which is opposed to the motorisation means 2 by a mobile equipment consisting of, on the one hand, all the watch holders 1 driven by the motorisation means 2, and on the other hand all the watches that all these same watch holders 1 carry, depending on the degree of winding of the watches. And these measuring means 3 include speed measuring means 4 to determine the speed and/or the variation in the speed of the motorisation means 2, and/or include torque measuring means 5 to determine the value of the torque and/or the variation in the torque at least at one watch holder 1, and/or include current measuring means 6 to determine the value of the current and/or the variation in the current at least at one electric motor 21 that the motorisation means 2 include.

More particularly, the measuring means 3 include such speed measuring means 4, which include fixed optical means 31 arranged to follow a mobile locator 32 that a watch holder 1 includes, and which are coupled with a time base 9, that the winding device 100 includes or with which the winding device 100 is interfaced. In an alternative, these optical means 31 are arranged to follow an oscillating mass 10 of at least one watch including a transparent back allowing the observation of the oscillating mass 10, or, more particularly, of each watch equipped with such a transparent back.

Thus, more particularly, at least one watch holder 1 is arranged to make visible the oscillating mass 10 of each watch carrying a transparent back that it carries, and viewing means 33 are arranged to follow and/or determine the angular position of an oscillating mass 10 of a given watch between a dead angle corresponding to the unwound state of the watch and a limit winding angle corresponding to the fully wound state of the watch. And the measuring means 3 are then advantageously arranged to send a stop signal to the motor means 2 when the limit winding angle is reached, to avoid any unnecessary winding, and therefore any wear of the watch.

More particularly, the motorisation means 2 include a direct current electric motor 21, which is not speed-controlled.

More particularly, the measuring means 3 then include speed measuring means 4, which are arranged to send a stop signal to the motorisation means 2 when the speed of the motorisation means 2 is less, by a predetermined value, than the speed of the motorisation means 2 at the start of the cycle when at least one watch carried by at least one watch holder 1 is in an unwound state. More particularly, this predetermined value is comprised between 0.2% and 1.4%. Still more particularly, the predetermined value is comprised between 0.6% and 1.0%.

More particularly, the measuring means 3 include torque measuring means 5, which are arranged to send a stop signal to the motorisation means 2 when the value of the measured torque is stabilised with a variation less than a predetermined threshold, such as 1.0% in a particular non-limiting variant.

More particularly, the measuring means 3 include torque measuring means 5, which are arranged to determine the real angular position of the centre of mass of the mobile equipment mentioned above, to compare it with a theoretical angular position corresponding to the fully wound state of each watch, and are arranged to send a stop signal to the motorisation means 2 when these real and theoretical positions are equal.

More particularly, the measuring means 3 include current measuring means 6 to determine the value of the current and/or the variation in the current at the motor that the motorisation means 2 include, in particular an electric motor 21, and which constitute torque measuring means 5.

More particularly, the measuring means 3 include such current measuring means 6 to determine the value of the current and/or the variation in the current at the electric motor 21, and which are arranged to send a stop signal to the motorisation means 2 when the current consumption is, for a duration greater than 80 seconds, more than 4.0% higher than the consumption at the start of the cycle when at least one watch carried by at least one watch holder 1 is in an unwound state. More particularly, these measuring means 3 are arranged to send this signal when the current consumption is, for a duration greater than 40 seconds, more than 2.0% higher than the consumption at the start of the cycle when at least one watch carried by at least one watch holder 1 is in an unwound state.

More particularly, the measuring means 3 are arranged to determine a difference in resistance according to the direction of rotation of a watch holder 1, and to impose a rotation of the watch holder 1 in the direction wherein it has the greatest resistance. This allows to determine the presence of automatic watches which are designed for winding in one direction only, and for freewheeling movement in the other direction; thus each movement imparted to the watch holder 1 is effective since it is used for rewinding.

More particularly, at least one watch holder 1 carries a single watch. Still more particularly, each watch holder 1 carries a single watch.

More particularly, the winding device 100 includes a single watch holder 1.

The invention has several major advantages, regardless of its embodiment:

no need to install an air or contact microphone;

independence from ambient noise, which generally constitutes a major obstacle to precise and reliable measurements;

no need to install a second wireless-powered on-board electronic circuit at the watch holder;

ease of speed measurement, with a very simple algorithm compared to that required for acoustic amplitude measurement;

high resolution of speed or torque measurements, however with a potentially high noise;

a relative measurement of the effect on the winder works with any automatic watch;

these measurements allow to quickly determine the correct rewinding direction.

What is claimed is:

1. A winding device for an automatic watch with mobile oscillating mass, including comprising:

at least one watch holder arranged to carry at least one automatic watch; and motorisation means for driving said at least one watch holder, wherein said device includes a multimeter which is arranged to measure a variation in a resistive torque based on a change of a winding angle which is opposed to said motorisation means by a mobile equipment consisting of, all said watch holders driven by said motorisation means, and all the watches that all said watch holders driven by said motorisation means carry, depending on a degree of winding of said watches, said multimeter includes speed measuring means to determine a speed and/or a variation in the speed of said motorisation means, torque measuring means to determine a value of a torque and/or a variation in the torque at least at one said watch holder, and/or a current meter to determine a value of a current and/or a variation in the current of at least at one electric motor that said motorisation means include.

2. The winding device according to claim 1, wherein said multimeter includes said speed measuring means which include a fixed optical means arranged to follow a mobile locator that said at least one watch holder includes, or to follow an oscillating mass of a watch including a transparent back allowing observation of said oscillating mass, the fixed optical means is coupled with a time base, and the time base is included in the winding device or is interfaced with the winding device.

3. The winding device according to claim 2, wherein at least one said watch holder is arranged to make visible the oscillating mass of each watch carrying a transparent back that it carries, an angular position sensor is arranged to follow and/or determine an angular position of an oscillating mass of a given watch between a dead angle corresponding to an unwound state of said watch and a limit winding angle corresponding to a fully wound state of said watch, and said multimeter is arranged to send a stop signal to said motorisation means when said limit winding angle is reached.

4. The winding device according to claim 1, wherein said motorisation means include a direct current electric motor which is not speed-controlled.

5. The winding device according to claim 4, wherein said multimeter includes said speed measuring means which is arranged to send a stop signal to said motorisation means when said speed of said motorisation means is less, by a predetermined value, than the speed of said motorisation means at a start of a cycle when at least one watch carried by at least one said holder watch is in an unwound state.

6. The winding device according to claim 5, wherein said predetermined value is comprised between 0.2% and 1.4%.

7. The winding device according to claim 6, wherein said predetermined value is comprised between 0.6% and 1.0%.

8. The winding device according to claim 1, wherein said multimeter includes said torque measuring means, which are arranged to send a stop signal to said motorisation means when the value of the measured torque is stabilised with a variation less than 1.0%.

9. The winding device according to claim 8, wherein said multimeter includes said current meter to determine the value of the current and/or the variation in the current at said electric motor.

10. The winding device according to claim 1, wherein said torque measuring means is arranged to determine an angular position of a centre of mass of said mobile equipment, to compare the angular position with a theoretical angular position corresponding to a fully wound state of each said watch, and said torque measuring means is arranged to send a stop signal to said motorisation means when said angular and theoretical positions are equal.

11. The winding device according to claim 1, wherein said multimeter includes said current meter to determine the value of the current and/or the variation in the current at said electric motor, and said multimeter is arranged to send a stop signal to said motorisation means when Raid a current consumption is, for a duration greater than 80 seconds, more than 4.0% higher than the current consumption at a start of a cycle when at least one watch carried by at least one said watch holder is in an unwound state.

12. The winding device according to claim 11, wherein said multimeter is arranged to send said stop signal to said motorisation means when the current consumption is, for a duration greater than 40 seconds, more than 2.0% higher than the consumption at the start of the cycle when at least one watch carried by at least one said watch holder is in an unwound state.

13. The winding device according to claim 1, wherein said multimeter is arranged to determine a difference in resistance according to a direction of rotation of said watch holder, and to impose a rotation of said watch holder in the direction wherein it has the greatest resistance.

14. The winding device according to claim 1, wherein at least one said watch holder carries a single watch.

15. The winding device according to claim 14, wherein each said watch holder carries a single watch.

16. The winding device according to claim 1, wherein said winding device includes a single said watch holder.

17. A winding device for an automatic watch with a mobile oscillating mass, comprising:

at least one watch holder arranged to carry at least one automatic watch; and motorisation means for driving said at least one watch holder, wherein said device is arranged to measure a variation in a resistive torque based on a change of a winding angle which is opposed to said motorisation means by a mobile equipment consisting of, all said watch holders driven by said motorisation means, and all the watches that all said watch holders driven by said motorisation means carry, depending on a degree of winding of said watches, said device includes speed measuring means to determine a speed and/or a variation in the speed of said motorisation means, and torque measuring means to determine a value of a torque and/or a variation in the torque at least at one said watch holder.

* * * * *